US005393416A

United States Patent [19]

Kozak et al.

[11] Patent Number: 5,393,416

[45] Date of Patent: Feb. 28, 1995

[54] APPARATUS FOR MAINTAINING A STABLE BATH FOR AN AUTODEPOSITION COMPOSITION BY PERIODICALLY SEPARATING PARTICULAR METAL IONS FROM THE COMPOSITION

[75] Inventors: William G. Kozak, Hatfield; Joseph C. Topping, North Wales, both of Pa.

[73] Assignee: Henkel Corporation, Plymouth Meeting, Pa.

[21] Appl. No.: 8,956

[22] Filed: Jan. 26, 1993

[51] Int. Cl.$^{6}$ ........................ B01J 47/02; B05D 1/18; B05D 7/14

[52] U.S. Cl. .................................. 210/96.1; 210/143; 210/167; 210/269; 204/180.8; 205/99; 118/602; 118/400; 118/429

[58] Field of Search ............... 118/602, 600, 400, 429; 427/345; 204/180.8; 210/96.1, 143, 167, 269, 266, 662, 688, 900, 189; 205/99

[56] References Cited

U.S. PATENT DOCUMENTS

| | | | |
|---|---|---|---|
| 2,628,191 | 2/1953 | Sard | 210/662 |
| 3,220,552 | 11/1965 | Staats | 210/189 |
| 3,312,189 | 4/1967 | McVey | 118/689 |
| 3,581,894 | 6/1971 | Minart | 210/189 X |
| 3,839,097 | 10/1974 | Hall et al. | 148/251 |
| 4,219,413 | 8/1980 | Jackson et al. | 210/25 |
| 4,275,448 | 6/1981 | LeDall | 364/500 |
| 4,303,704 | 12/1981 | Courduvelis et al. | 427/345 |
| 4,568,465 | 2/1986 | Davis et al. | 210/662 |
| 4,668,402 | 5/1987 | Norton | 210/662 |
| 4,863,612 | 9/1989 | Kirman et al. | 210/662 |

FOREIGN PATENT DOCUMENTS

| | | |
|---|---|---|
| 2017026 | 4/1991 | Canada . |
| 0023655 | 7/1973 | Japan . |
| 0079197 | 5/1982 | Japan . |
| 62-193652 | 8/1987 | Japan . |

OTHER PUBLICATIONS

Stefan Muller; "Process Control of the Grosshansdorf Waterworks"; *Siemens Review,* vol. XLV, No. 1 pp. 17–21, 1978.

*Primary Examiner*—Michael W. Ball
*Assistant Examiner*—Francis J. Lorin
*Attorney, Agent, or Firm*—Ernest G. Szoke; Wayne C. Jaeschke; Kenneth Watov

[57] ABSTRACT

An automated system is disclosed for providing at least periodic removal of metal ions from a chemical complex and contaminants from a chemical bath. The chemical bath is a latex solution containing charged latex particles and having an acidic pH to form a coating by autodeposition, the charged particles tending to coagulate when subjected to a high shear circulation. The system uses an ion exchange column containing an iminodiacetate ion exchange resin for removal of the metal ion contaminants. The chemical bath is passed through the ion exchange column at a low velocity to prevent coagulation of the latex particles. Conductivity measurement devices and controllers are used to automate the operation of the system. Also, additional sensors, such as pressure and level sensors, controllers, filters, circulation pumps and tanks are used for performing rinsing and regeneration of the ion exchange column.

20 Claims, 4 Drawing Sheets

APPARATUS FOR MAINTAINING A STABLE BATH FOR AN AUTODEPOSITION COMPOSITION BY PERIODICALLY SEPARATING PARTICULAR METAL IONS FROM THE COMPOSITION

RELATED INVENTION

The invention of the present application is related to the commonly assigned invention of co-pending application Ser. No. 07/847,543, filed on Mar. 6, 1992, for "PROCESS FOR SEPARATING MULTIVALENT METAL IONS FROM AUTODEPOSITION COMPOSITIONS AND PROCESS FOR REGENERATING CHELATING TYPE ION EXCHANGE RESINS USEFUL THEREWITH". The teachings of this co-pending application are incorporated into this present application in their entirety by reference, provided any such teachings are not inconsistent with any teaching herein.

BACKGROUND

1.0 Field of the Invention

The field of the present invention relates generally to chemical baths in which metal ions build up over a period of time and must be periodically removed, and more particularly to such systems providing for coating materials, such as metals including steel, with a paint coating via a chemical reaction, in which systems an autodeposition composition bath is periodically stabilized by removing therefrom dissolved and/or dispersed multivalent metal ions accumulated over a period of operation.

2.0 Discussion of Related Art

Autophoresis and electrophoresis are two known processes for coating objects, particularly those fabricated from metallic material, with a coating composition. The electrophoresis effect provides for electrodeposition through the use of an electric field to control the movement of charged organic molecules to a workpiece serving as one electrode of a typically two-electrode system. The magnitude of electrical current and time of application is controlled for coating the workpiece to a desired thickness. The autophoresis effect permits an autodeposition coating process to be carried out via control of the de-stabilization and deposition of high-molecular-weight negative or neutrally-charged latex polymer particles, for example, onto a workpiece having a metallic surface that is chemically treated to produce positively charged ions at the surface of the workpiece which attract the oppositely or neutrally charged particles of coating composition. The parts to be coated are typically dipped into a coating bath containing the desired coating composition. Workpieces of iron, steel, galvanized metal coated with zinc, and so forth, at least about the outer surfaces of the workpiece, can typically be coated via an autodeposition coating process.

A problem in systems carrying out an autodeposition coating process is that over a period of time metal ions having a valence of two or higher (multivalent ions), dissolve and/or disperse into the bath or autodeposition composition, increasingly reducing the effectiveness of the autodeposition coating process. As the metal ions increase in concentration in the autodeposition composition, the quality of the coatings produced on the workpieces diminishes to the point where the coating composition or autodeposition bath must be replaced, or a portion of the bath must be removed and new uncontaminated coating composition added, to reduce the concentration of the metal ions, for permitting the autodeposition coating process to continue. A number of attempts have been made in the prior art to periodically remove the metal ions from the autodeposition bath or coating composition, for providing more economic use of the coating composition bath, and avoiding the necessity of disposing of contaminated bath, with all of the environmental hazards associated therewith.

Hall et al., U.S. Pat. No. 3,839,097, issued on Oct. 1, 1974, teaches the stabilization of acidic aqueous coating compositions by removing metal ions through use of an ion exchange material, such as an ion exchange resin. The ion exchange material is regenerated periodically to restore its ion exchange capacity. To accomplish such regeneration in the ion exchange material, the metal ions therein are displaced, and replaced with cations which are replaceable by metal ions to be removed from the coating composition. In one example given, an ion exchange column packed with beads of ion exchange material was first rinsed with water to reclaim residual coating composition in the column. Deionized water is thereafter run through the column to completely rinse it out. In the example given, the beads of ion exchange material are thereafter regenerated with an aqueous solution of a strong acid, in applications where the ion exchange material includes a replaceable hydrogen ion. Although the process for stabilizing a coating composition bath is taught in this reference, and also a further process for removing metal ions from beads of ion exchange material in an ion exchange column, and then regenerating the ion exchange resin, no system is shown or described for carrying out the process. For purposes of this application, the specification of Hall et al., U.S. Pat. No. 3,839,097, is incorporated herein by reference, to the extent that such teachings are not inconsistent with teachings herein.

An application for Canadian Patent Serial No. 2,017,026, published on Apr. 17, 1991, for "METHOD FOR TREATMENT OF ELECTRODEPOSITION BATH". The Canadian application teaches a method for continuously or intermittently removing a portion of an electrodeposition bath contained in a tank 10, and passing the removed portion through an ultrafilter 16. Filtered resin, pigment, and other higher molecular weight components are returned to the bath. Only the ultrafiltrate is passed through an ion exchange column 22 to remove iron and other materials from the ultrafiltrate. The filtrate from the ion exchange column 22 is returned to the electrodeposition bath, and waste products are removed from the ion exchange column 22 and disposed of. The ion exchange column 22 is regenerated by passing sulfuric acid through the column. A system for accomplishing this is taught only in a very elementary manner.

McVey, U.S. Pat. No. 3,312,189, issued on Apr. 4, 1967, shows an apparatus for forming a chromate coating on a metal surface, such as aluminum. An aqueous acidic operating solution containing hexavalent chromium ions and contaminating anion complexes is applied to the metal surface. A fluid flow control system is used for passing controlled proportions of the treating solution through cation exchange resin, and for returning the effluent therefrom back to the treatment or operating solution. Conductivity sensors are used for measuring the electrical conductivity of the effluent, which conductivity measurements are used by a controller for increasing the proportion of solution passing through the cation exchange resin in response to a decrease in the electrical conductivity of the effluent below a predetermined incremental amount higher than the solution which does not pass through the exchange resin.

In order to satisfy a recognized need in the field of the present invention, the present inventors conceived and developed a substantially automated system for periodically removing contaminants from coating composition baths used in autodeposition processing. In designing the present system, the inventors recognized the need to provide that substantially all of the autodeposition bath or coating composition be utilized in coating parts, compared to prior systems which wasted costly quantities of the autodeposition baths due to contamination thereof after a period of use forcing disposal of the same. The present inventors further recognized the requirement to provide a system which substantially minimizes the production of waste products harmful to the environment. By designing a substantially automated system for autodeposition processing, maximum economics are obtained through the use of substantially all of the costly autodeposition bath or coating composition material.

The present inventors recognized that it is contrary to prior teachings to pass a chemical containing particulates, such as latex and pigment included in autophoretic or autodeposition baths through an ion exchange (IEX) column. They conceived the present system to accomplish this operation, and overcame the problems in the prior art such as clogging of IEX columns by autophoretic baths.

3.0 Summary of the Invention

An object of the invention is to provide an improved system for autodeposition processes.

Another object of the invention is to provide an improved system for autodeposition processes that maximizes the usage of the autodeposition bath, and minimizes the production of harmful waste products.

Yet another object of the invention is to provide a substantially automated system for stabilizing a chemical bath through use of an ion exchange column to remove metal ions from the bath on a periodic basis, and further through periodic cleansing and regeneration of the ion exchange column.

With these and other objects of the invention in mind, the present invention provides for a substantially automated system programmed for periodically stabilizing a chemical bath or an autodeposition bath by passing all or a portion of the bath through a plurality of filters and an ion exchange column, for removing metal ions and other contaminants from the bath that have accumulated therein over a period of time. The system further provides for automatically pumping deionized water from a supply tank through the ion exchange column for returning treated bath from the column back to the storage tank holding the chemical or autodeposition bath. The system periodically provides for regenerating the ion exchange column by passing a regenerant acid through the ion exchange column to remove metal ions collected by the column from the autodeposition bath. Thereafter, the column is then automatically flushed out with deionized water to remove the residual acid remaining in the ion exchange column, thereby preparing the ion exchange column for another cycle of cleansing the autodeposition bath of metal ions and contaminants. Waste water and waste regenerant acid is automatically dispensed from the system to a treatment plant, in an environmentally safe manner. In another embodiment of the invention, acid passed through the ion exchange column may be collected in a reuse tank, for reuse in regenerating the ion exchange column, to the extent possible. A controller, such as a microprocessor, for example, is programmed for controlling valving means and pumping means for circulating the autodeposition or chemical bath, the deionized water, and regenerant acid, through the system in a controlled manner. An air operated diaphragm pump is used to pump the autophoretic bath to provide low shear pumping.

BRIEF DESCRIPTION OF THE DRAWINGS

Various embodiments of the present invention are described below with reference to the drawings, in which like items are identified by the same reference designation, and in which.

DETAILED DESCRIPTION OF THE INVENTION

Figure 1A:
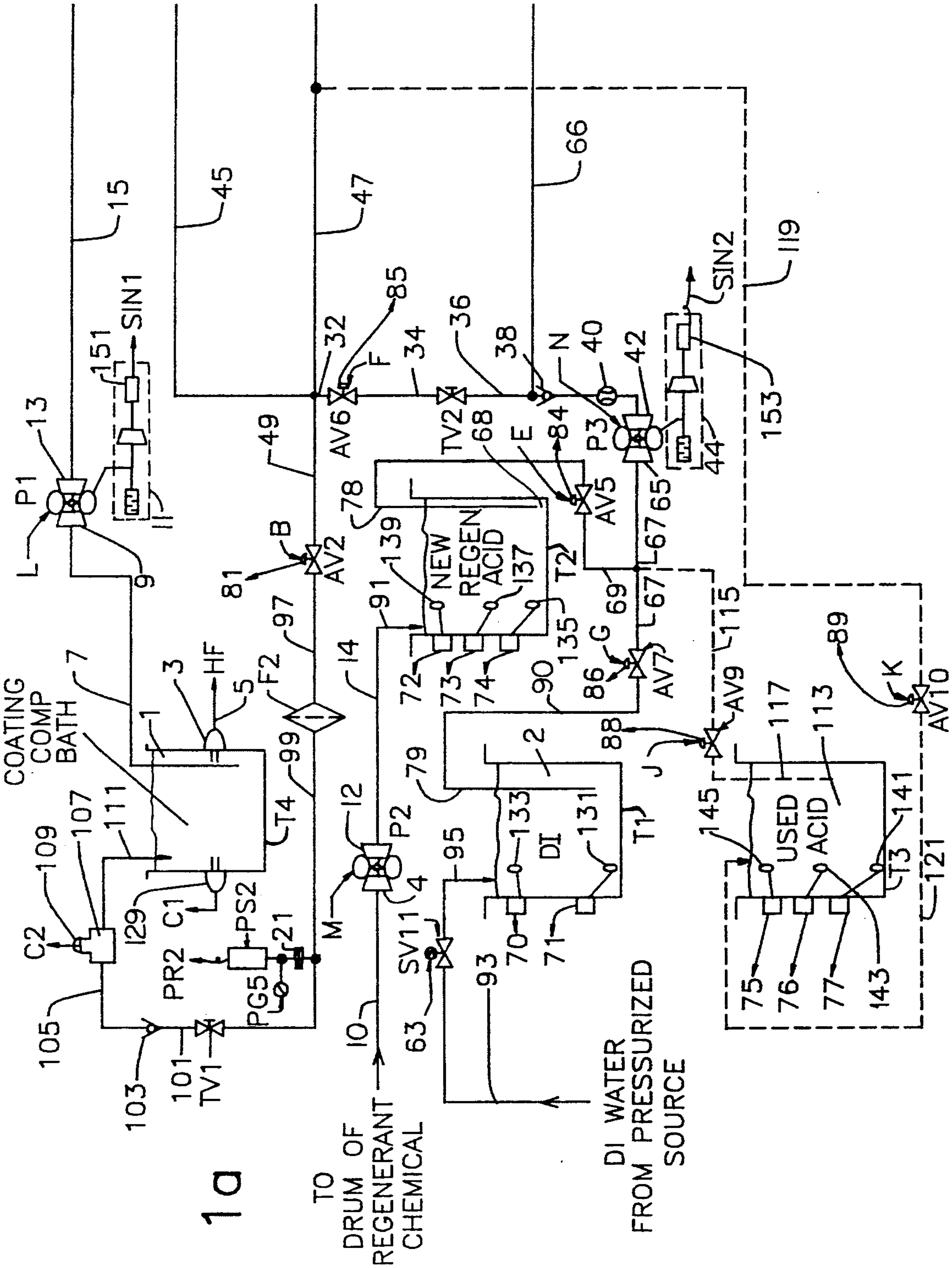
FIGS. 1A and 1B show portions of a flow schematic diagram for one embodiment of the invention.
Figure 1B:
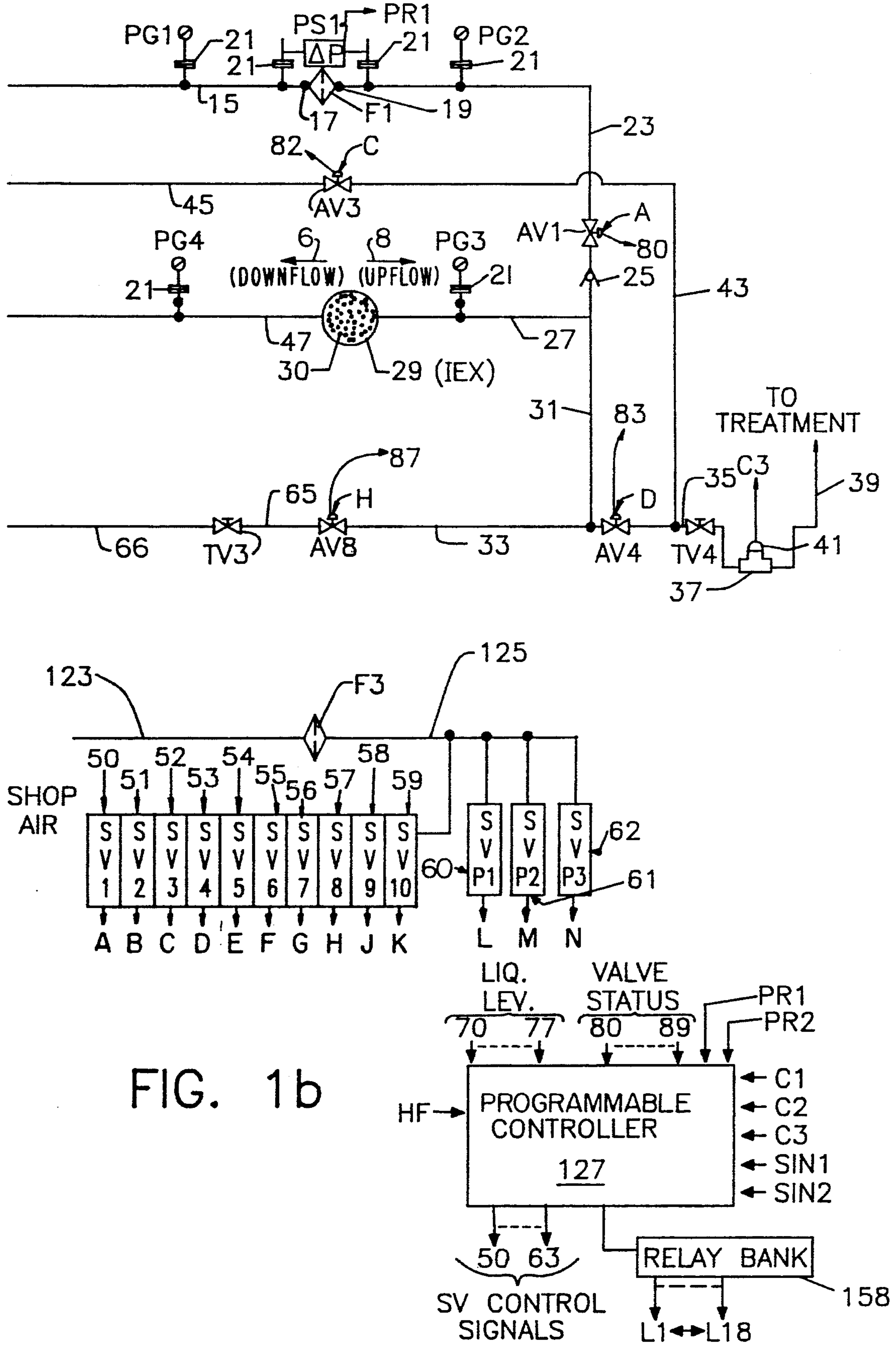

With reference to FIG. 1, a system is shown for processing a chemical bath, particularly an autodeposition composition in this illustration, to separate therefrom multivalent metal ions through use of a chelating type ion exchange resin 30, and for regenerating the chelating resin 30, all in a periodic and substantially automated manner. As indicated above, a preferred process used in the present system is illustrated and described in detail in co-pending related application Ser. No. 07/847,543, filed on Mar. 6, 1992, entitled "Process For Separating Multivalent Metal Ions From Autodeposition Compositions And Process For Regenerating Chelating Type Ion Exchange Resins Useful Therewith", which is incorporated herein by reference to the extent that teachings therein do not conflict with teachings relative to the present system. As indicated therein, aqueous resinous coating compositions are used in autodeposition systems for forming a coating of relatively high solids concentration on metallic surfaces immersed therein. The thickness of the coating applied to the metallic surface is controlled by varying the length of time the metallic workpiece is immersed in the coating composition, and controlling the bath composition (e.g. HF, $FeF_3$, and latex concentrations, for example).

Although the description of the present system is illustrated herein relative to a preferred autodeposition process, the system is not limited to use with autodeposition baths where polymer is involved. The system can be used to periodically remove metal ions, that may build up over time, from many types of chemical baths.

Typically, the autodeposition coating process is used for coating metallic workpieces of iron, steel, and/or galvanized metal for example. The coating composition typically includes latex polymers processed to provide negatively charged particles of latex in solution. The coating composition bath is maintained to be mildly acidic for reacting with a submerged metal workpiece to cause associated metallic ions on the surface of the workpiece to become positively charged. As a result, the positively charged metallic ions attract the negatively charged latex particles from solution, causing the latex particles to be deposited on the surface of the metallic workpiece. The thickness of the coating is very thin, and typically controlled between 0.5 to 0.7 mil, in this example, whereby very small portions of the coating composition are used in the coating of large numbers of workpieces.

During the autodeposition coating of workpieces, metallic ions from the workpieces accumulate in the coating composition over time due to dissolution from the workpieces. As the concentration of the metallic ions increases in the coating composition bath, a level is reached where the quality of the coatings obtained is negatively affected. Also, the concentration of metallic ions may increase to a level where the coating composition begins to coagulate and become unstable. Accordingly, before such negative performance is reached, it is important to periodically remove the accumulated metal ions from the coating composition bath.

With further reference to FIG. 1, a system for removing metallic ions from an coating composition bath includes a tank T4 containing the coating composition bath 1. For purposes of illustration, assume that the workpieces being passed through the coating composition bath 1 are steel, and that the bath 1 includes hydrofluoric acid (HF) of a given concentration. In an optional embodiment, the concentration of the HF is monitored through use of a transducer 3 immersed in the tank T4. A signal line 5 from transducer 3 transmits an electrical signal having a voltage level proportional to the concentration of HF. A conductivity transducer 129 is immersed in the coating composition bath 1 in tank T4, for providing a signal C1 having a level indicative of the conductivity of bath 1. A draw conduit or pipe 7 has one end deeply immersed in the coating composition bath 1, and another end connected to an input port 9 of an air operated pump P1. An air operated diaphragm pump is preferred for P1 because of the requirement of low shear when pumping an autophoretic bath. A stroke indicator assembly 11 is connected to the pump P1 for providing a signal SIN1 (via a pressure switch 151) indicative of each stroke taken by the pump. By monitoring the number of strokes taken by the pump during a given cycle of operation, a measurement of the quantity of coating composition passed through the pump can be obtained. In this example, each stroke of pump P1 pumps 0.016 gallons. An output port 13 of pump P1 is connected by a fluid line or conduit 15 to an inlet port 17 of a filter F1. An outlet port 19 of filter F1 is connected to one end of an automatic air operated valve AV1. Note that the fluid line 15 is connected by a gage isolator 21 to a pressure gauge PG1 monitoring the pressure between pump P1 and filter F1. Also, a pressure sensor PS1 is connected by gauge isolators 21 across filter F1. PS1 is, in this example, representative of a normally open switch when filter F1 is clear causing a low pressure to be developed across PS1. When filter F1 becomes clogged, a pressure is developed across PS1 causing it to respond by closing an internal adjustable switch (not shown) to cause signal PR1 to change state from zero volt to +5 volts, in this example, indicating a clogged filter F1. Accordingly, signal PR1 is indicative of the differential pressure between the inlet port 17 and the outlet port 19 of filter F1 exceeding a predetermined level. Also, a gauge isolator 21 connects another pressure gauge PG2 to fluid line 23, for providing a measurement of the pressure between outlet 19 of filter F1, and one port of automatic valve AV1.

The output port of valve AV1 is coupled through a check valve 25 via a fluid line or pipe 27 to an ion exchange column (IEX) 29, and through another fluid path or pipe 31 commonly connected at one end to pipe 27, to a common connection with a fluid line or pipe 33 connected between fluid ports of automatic valves AV4 and AV8. The other end or port of automatic valve AV4 is connected via fluid line 35 to one end of a throttle valve TV4, the other end of the latter being connected to one port of a Tee coupling 37, the other port of the latter being connected via fluid conduit or pipe 39 to treatment apparatus (not shown). A fluid conductivity transducer 41 is installed on the Tee 37 for providing a signal C3 indicative of the conductivity of the fluid being discharged or passed therethrough.

A conduit or fluid line 43 is connected at one end into the fluid path 35 between valves AV4 and TV4, and at its other end to one port of automatic valve AV3. The other end or port of valve AV3 is connected via fluid line 45 to a common connection between the ends of fluid lines 47, 49 and 32, for connections via the other ends of fluid line 47 to a fluid port of ion exchange column (IEX) 29, of fluid line 32 to one port of an automatic valve AV6, and of fluid line 49 to one port of automatic valve AV2. The other port of automatic valve AV6 is connected via fluid line 34 to one port of throttle valve TV2. The other port of throttle valve TV2 is connected via fluid line 36 through a check valve 38 in series with a rotometer 40 to an outlet port 42 of a pump P3. Check valve 38 is oriented for passing fluid from rotometer 40 to throttle valve TV2. Fluid line 36 is also connected via fluid line 66 to one port of another throttle valve TV3, the other port of which is connected via fluid line 65 to the other port of automatic valve AV8.

A stroke indicator 44 is connected to pump P3 for providing a signal SIN2, via a pressure switch 153, indicative of the number of strokes of pump P3 during a given cycle of operation, for providing a measurement of the fluid being pumped therethrough (0.016 gallons/-stroke in this example). An inlet port 65 of pump P3 is commonly connected via fluid lines 67 and 69 to fluid ports of automatic valves AV7 and AV5, respectively. The other fluid port of automatic valve AV5 is connected via fluid line 78, which has an open end positioned near the bottom of a tank T2 containing new regenerant acid 68 (HF in this example). The other port of automatic valve AV7 is connected via a fluid line 90 to a suction or draw pipe 79 having a free end positioned within and near the bottom of a tank T1 containing deionized (DI) water 81. The purpose of tank T1 is to allow for an inventory of DI water to be stored, to permit operation of the system in plants where the instantaneous flow rate of the inplant DI water is insufficient to supply the DI water requirements of IEX 29.

A pump P2 has an inlet port 4 connected via a fluid line 10 to a drum of fresh regenerant chemical or acid (not shown). An outlet port 12 is connected via a fluid line 14 to a feedpipe 91, for discharging new regenerant acid 68 into tank T2 during a refill cycle.

An electrically operated solenoid valve SV11 has one fluid port connected via a fluid line 93 to a pressurized source of deionized (DI) water (not shown). The other fluid port of valve SV11 is connected to a fluid feed line 95, for discharging from the latter DI water into tank T1, during a refill cycle therefor.

Another fluid port of automatic valve AV2 is connected via a fluid line 97 to an inlet port of a filter F2. An outlet port of filter F2 is connected via fluid line 99 to one port of a throttle valve TV1. A gauge isolator 21 is used to connect both a pressure gauge PG5 and a pressure switch PS2 to fluid line 99, as shown. PS2 is representative of a normally open switch (not shown) with no applied pressure. When F2 is unclogged, high back pressure causes the associated signal PR2 to be at zero volt. PS2 responds to a predetermined pressure drop caused by clogging of F2, by opening an internal switch to cause signal PR2 to change state from +5 volts to zero volt, in this example. In other words, pressure switch PS2 provides a signal PR2 indicative of the pressure in fluid line 99 or at the outlet of filter F2 being below a predetermined value. The other port of throttle valve TV1 is coupled via fluid line 101 to an inlet end of a check valve 103, the outlet port of the latter being connected via a fluid line 105 to one port of a Tee coupling 107. A conductivity transducer 109 is mounted on the Tee coupler 107, for providing a conductivity signal C2 indicative of the conductivity of the fluid passing through the Tee coupler 107. The other end of the Tee coupler 107 is connected to a feedpipe 111 for discharging treated coating composition 1 back into tank T4, as will be described in detail below.

Another embodiment of the present inventive system (shown in phantom) is considered optional, and includes a tank T3 for containing once used regenerant acid 113. This embodiment further includes a fluid line 115 connected between the common connection of fluid lines 67 and 69, and one port of automatic valve AV9. The other port of automatic valve AV9 is connected to one end of fluid line 117, the other end of which is located within and near the bottom of tank T3. A fluid line 119 has one end connected to the common connection of fluid lines 31 and 33, and another end connected to one port of an automatic valve AV10. The other fluid port of valve AV10 is connected via a fluid line 121 for discharging once used regenerant acid 113 into tank T3, as will be described below.

A source of air (not shown) provides "shop air" of controlled pressure via conduit or pipe 123 to an inlet port of a filter F3, the outlet port of which is connected via air pressure line 125 to a plurality of solenoid operated valves SV1 through SV10, and SVP1 through SVP3, respectively. These valves are individually controlled by a controller 127 via electrical control signals 50 through 62, respectively, generated by controller 127 at appropriate times, as will be described in detail below. When solenoid valves SV1 through SV10 are individual energized, in this example they open to provide air pressure signals A,B,C,D,E,F,G,H,J, and K, respectively, which air pressure signals are individually coupled to automatic air operated valves AV1 through AV10, respectively, for opening these valves. Similarly, when solenoid valves SVP1, SVP2, and SVP3, are individually energized by controller 127, these valves open to provide air pressure signals L,M,N, respectively, for application to pumps P1, P2, P3, respectively, for energizing these air operated pumps, in this example.

A low level sensor 131 is positioned within and near the bottom of tank T1, for providing a signal 71 indicative of the fluid level in tank T1 dropping to below a predetermined low level. Also, a high level sensor 133 is located within tank T1 at a predetermined level below the top of the tank, for providing a +5 volt level signal 70, in this example, indicative of the DI water level reaching the position of level sensor 133. Note that in this example, switches associated with level sensors 131 and 133, and others discussed below, are normally-open switches. All such level sensors, as described herein, produce a level signal of zero volt when liquid is below the level of the associated level sensor, and a level signal +5 volts when liquid is at or above the level of the associated level sensor, for example.

Tank T2 includes a low level sensor 135 located within or near the bottom of the tank, for producing a low level signal 74 of zero volt indicative of the acid therein dropping to below the level of the sensor 135; a mid level sensor 137 for producing a signal 73 of zero volt, whenever the acid level drops to below the level of this sensor; and a high level sensor 139 located near the top of tank T2, for producing a level signal 72 of +5 volts, in this example, indicative of the acid within the tank attaining the level of sensor 139. In substantially the same manner as tank T2, tank T3 includes a low level sensor 141 for producing a low level signal 77, a mid level sensor 143 for producing a mid level signal 76, and a high level sensor 145 for producing a high level signal 75.

During automatic control of the system of FIG. 1, the controller 127 responds to the liquid level signals 70 through 77, valve status signals 80 through 89, pressure signals PR1 and PR2, conductivity signals $C_1$ through $C_3$, and stroke pulse signals SIN1 and SIN2, for providing SV control signals 50 through 63, when required for different modes of operation of the system. These modes of operation are described in detail below.

In an engineering prototype of the present system, the controller 127 is provided by an Allen Bradley SLC-500 PLC microprocessor (manufactured by Allen Bradley, Inc., Milwaukee, Wis.). Throttle valve TV1 is a diaphragm type throttle valve GF type 314 (manufactured by George Fischer Ltd., Schaffhausen, Switzerland), for passing fluid containing coating composition. Throttle valves TV2 and TV4 are adjustable needle valves GF Type 522. Throttle valve TV-3 is an adjustable Y-globe valve GF Type 301. The level sensors 131, 133, 135, 137, 139, 141, 143, and 145, are Thomas float switch Model 4400 sensors (manufactured by Thomas). Valves AV1 through AV10 are GF type 220 with manual override (manufactured by George Fischer, Schaffhausen, Switzerland). Filter F1 is a Sethco bag filter (manufactured by Met Pro Corporation, Sethco Division, Hauppauge, N.Y.). Filter F2 is a Sethco bag filter F1, Model No. DBG-1. Air operated pumps P1, P2, and P3, are provided by Marlow type 1/2AODP pumps (manufactured by Marlow ITT Fluid Technology Corporation, Mid Land Park, N.J.).

The ion exchange column 29 is provided by a vinyl ester tank about twelve inches in diameter, and 38 inches in length, in this example. It has its longitudinal axis vertically oriented. The ion exchange column 29 is filled with an appropriate ion exchange resin 30, in this example Amberlite® IRC-718 (manufactured by Rohm & Haas Co., Pa.). Other examples of suitable IEX resins 30 include Miles/Bayer Lewatit TP-207, Purolite S-930, Sybron Ionac SR-5, Bio-Rid Chelex 20 or Chelex 100, Mitsibushi Diaion CR11, and other similar iminodiacetate based resins. This resin 30 permits ferric and ferrous iron ions to be removed from coating composition 1 passed through the ion exchange column 29, in this example. Other types of resins are available for removing other metallic ions, such as those of chromium or zinc, for example. In this example, the regenerant acid 68 is hydrofluoric acid in greater than 1% concentration.

Solenoid valves SV1 through SV10 are provided by Burkett Type 470 valves (Ohio Components, Parma, Ohio). The solenoid operated valve SV11 is an electrically operated solenoid valve, controlled by electrical signal 63 from controller 127. The other components used in the prototype system are typical standard components which are readily available. Note further that the actual components as previously indicated for a prototype system are not meant to be limiting, and any suitable substitute can be used.

Note that the automatic air actuated valves AV1 through AV10 each include pairs of output or valve status signals 80 through 89, respectively, for providing an active signal indicative of the valve's present position, that is indicative of either an open or a closed position. As shown, controller 127 senses the status of each valve through monitoring of these pairs of signals 80 through 89. As a result of such signal monitoring, the solenoid valve control signals 50 through 63 are outputted by controller 127 at appropriate times for conducting various modes of operation of the present system. Also, controller 127 can test valves AV1 through AV10 for proper operation through monitoring of these signals.

Figure 2:
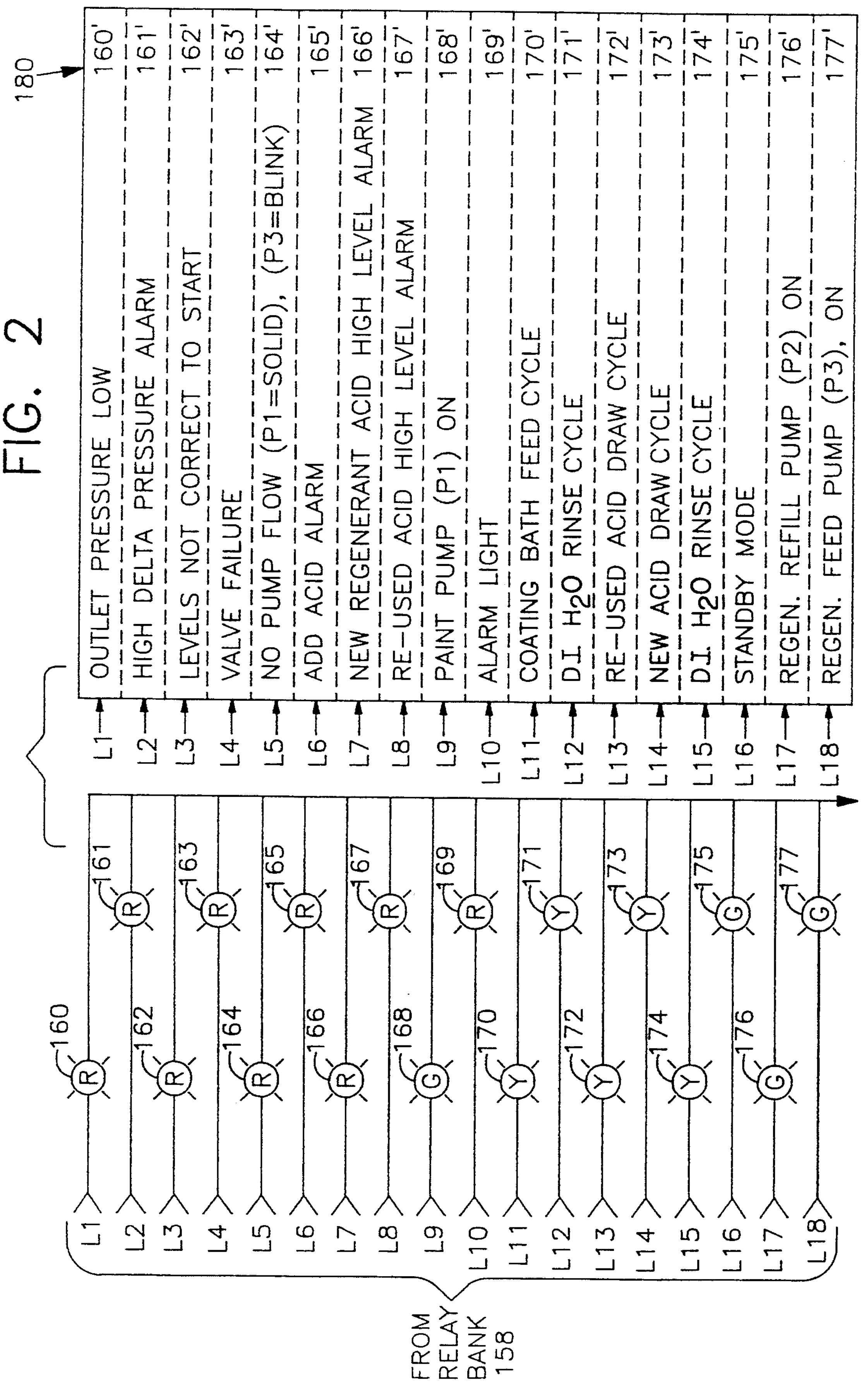
FIG. 2 is a partial electrical circuit schematic showing a plurality of lamps and/or visual indicators providing alarm indications for one embodiment of the invention.

In another embodiment of the invention, a visual alarm system is provided. Controller 127 drives a relay bank 158, for energizing associated relays to provide lamp signals L1 through L18 at appropriate times. In FIG. 2, lamps 160 through 177 are responsive to lamp signals or voltages L1 through L18, respectively, for lighting to provide a visual indication of an associated panel message indicating a particular component or system operation, or showing a defaulting component or system operation, as indicated by the respective legends shown. In this example, lamps with an "R" designation are red in color, those with a "G" designation are green, and those with a "Y" designation are yellow. However, any desired combination of colors can be used for the lamps 160 through 177. In one embodiment, the lamps 160 through 177, as shown in FIG. 2, are individually associated with message displays 160′ through 177′ of a backlit display panel 180. Alternatively, in another embodiment, the lamps 160 through 177 are mounted on a display panel each adjacent to an associated printed alarm or component operation message 160′ through 177′ respectively, as shown for the backlit panel 180. In the alternative embodiment, the lamps 160 through 177, respectively, are energized to light adjacent to their associated message display 160′ through 177′, respectively. In an engineering prototype for the present system, the latter embodiment is used. Note that the alarms are provided, in this example, for permitting a low skilled operator to correct problems that may occur during operation of the system.

Figure 3:
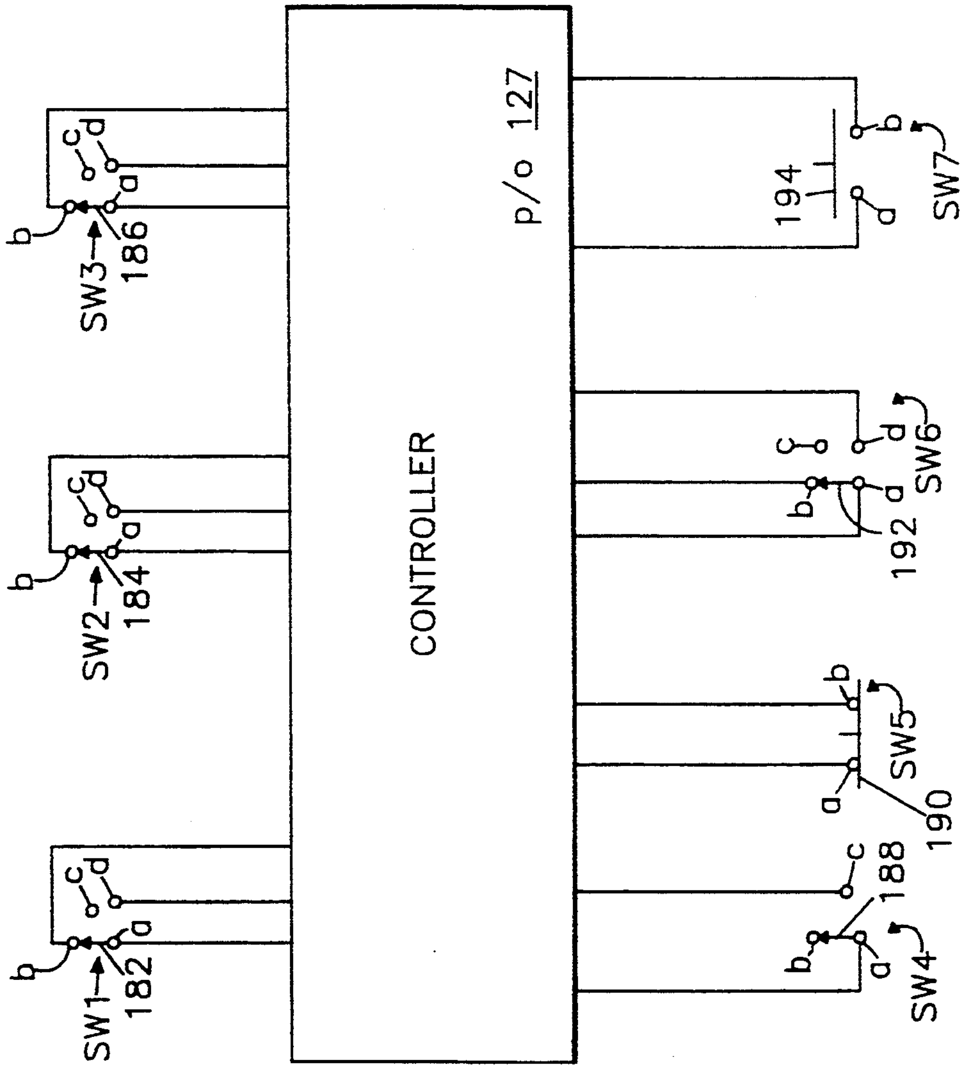
FIG. 3 shows a layout diagram for a plurality of switches for one embodiment of the invention.

In FIG. 3, seven switches SW1 through SW7 are shown with connections to controller 127. In this example, switches SW1 through SW3 and SW6 are three position rotary switches. Switch SW4 is a two position rotary switch. Switch SW5 is a normally closed pushbutton switch, and switch SW7 is a normally open pushbutton switch. These switches are typically located on a control panel in the system. Contacts "a", "b", and "d" of switches SW1, SW2, SW3, and SW6 are connected to controller 127, as shown. Contacts "a" and "c" of switch SW4 are connected to controller 127. Contacts "a" and "b" of each of switches SW5 and SW7 are connected to controller 127.

The programming of controller 127 in response to different positions of switches SW1 through SW7 will now be described. Switch SW1 is identified on a control panel (not shown) as a "Regeneration/DI Water Pump Switch P3". When the arm 182 of this switch is rotated to electrically connect contacts "a" and "b", SW1 is in an indicated "ON" position Controller 127 responds by energizing solenoid valve SVP3, opening the valve to cause air pressure signal N to be applied to pump P3, energizing this pump. However, such action will only occur if switch SW3, designated as the "SYSTEM CONTROL" is operated by rotating its arm 186 for electrically connecting either contacts "a" and "b", or contacts "a" and "d". If the arm 182 of switch SW1 is positioned for electrically interconnecting its contacts "a" and "c" this is a designated "OFF", position, in which pump P3 cannot be energized. When arm 182 is rotated to electrically connect contacts "a" and "d", this position is designated as the "AUTO" position, for programming pump P3 to be energized at appropriate times during various programmed sequences.

Switch SW2 is designated as the "PAINT PUMP P1" switch. When its arm 184 is rotated to electrically connect associated contacts "a" and "b", the switch is in a designated "ON" position, provided that SYSTEM CONTROL switch SW3 is not in its "OFF" position (arm 186 electrically connecting contacts "a" and "c" thereof). When switch arm 184 is rotated to electrically connect contact "a" to contact "c", this is designated as the "OFF" position for SW2, in which pump P1 is prevented from being energized. When switch arm 184 is rotated to electrically connect associated contacts "a" and "d", this is designated as the "AUTO" position, in which pump P1 is energizable at appropriate programmed times during automatic operation of the system, to be described below.

Switch SW3 is designated as a "SYSTEM CONTROL" switch. When its arm 186 is positioned for electrically connecting contacts "a" and "b" thereof, this is designated as the "AUTO" position, and controller 127 in response thereto is programmed to place the system in automatic operation. When switch SW3 has its arm 186 rotated to electrically connect associated contacts "a" and "c", the switch is in a designated "OFF" position, preventing operation of the system. When arm 186 is rotated to electrically connect associated contacts "a" and "d", this is designated as the "PB START" position. When switch SW3 is in this position, controller 127 is programmed to respond to activation of pushbutton switch SW7 by depression of pushbutton contact 194 thereof, for interconnecting associated contacts "a" and "b". Controller 127 is programmed to respond to the latter switch operation by initiating one cycle of treatment of the coating composition 1, as will be described in detail below.

With further reference to "SYSTEM CONTROL" switch SW3, when this switch is placed in its "AUTO" position by moving its arm 186 to electrically connect associated contacts "a" and "b", the programmed treatment of the coating composition 1 will be cyclically repeated at predetermined intervals of time. When "SYSTEM CONTROL" switch SW3 has its arm 186 positioned for electrically connecting associated contacts "a" and "c", in an "OFF" position, the system is placed in a manual mode of operation, and an operating cycle will be stopped. However, controller 127 is programmed to respond thereto by first checking to determine whether any paint or coating composition 1 remains in the ion exchange column 29. If the answer is "yes", controller 127 is programmed to continue the portion of the sequence for operation of the system for pumping coating composition 1 through the ion exchange column 29. If controller 127 determines that for the operating cycle stopped when the system switch SW3 was moved to its "OFF" position, the pumping of coating composition 1 through the ion exchange column 29 had previously been terminated, controller 127 is programmed to initiate a cycle of operation for flushing out the ion exchange column 29 with deionized water 81, as described in detail below. After this flushing cycle, the controller 127 is programmed to initialize itself for resetting all parameters in the system to prepare for responding to the "SYSTEM CONTROL" switch SW3 either being operated by moving its associated arm 186 to electrically connect associated contacts "a" and "d", thereby placing switch SW3 in its designated "PB START" position, or being operated by moving its associated arm 186 to electrically connect associated contacts "a" and "b", thereby placing S3 in its designated "AUTO" position. When "SYSTEM CONTROL" switch SW3 is moved to its "PB START" position, as previously mentioned, controller 127 is thereafter programmed to respond to energization of the "START CLEAN-UP SEQUENCE" pushbutton switch SW7, in this example.

Switch SW4 is designated as the "REGEN CHEMICAL PUMP P2". In the "OFF" position of this switch, its arm 188 is positioned for electrically connecting associated contacts "a" and "b". In this "OFF" position, pump P2 cannot be energized, and controller 127 is programmed to reset a refill cycle for refilling tank T2 with new regenerant acid or chemical regenerant 68, as will be described in detail below. Switch SW4 is placed in a designated "AUTO" position when its arm 188 is rotated to electrically connect associated contacts "a" and "c". In this position, pump P2 can be energized to refill tank T2 with new regenerant chemical or acid under the control of controller 127, which will de-energize pump P2 upon sensing the level of acid in the tank reaching a predetermined filled level. In this example, controller 127 is programmed to not in any event permit the pump P2 to be operated for more than a 30 minute period of time in a given refill cycle.

Switch SW5 is designated as an "EMERGENCY STOP" switch. When the pushbutton 190 of this switch is depressed, the electrical connection between associated contacts "a" and "b" is broken, and the switch SW5 mechanically maintains this position. Controller 127 is programmed to respond to the operation of the emergency stop switch SW5 by first checking to see if the switch has been manually returned to its inoperative position by being pulled outward, in which case if a treatment cycle had been interrupted, that cycle will be resumed from where it was previously interrupted. However, if controller 127 determines that the "EMERGENCY STOP" switch SW5 remains activated, system operation will be terminated, but the system will not be reset. Next, all alarms (to be described in detail below) will be reset except for outlet pressure low alarm 160, 160′, high delta pressure alarm 161, 161′, no pump flow alarm 164, 164′, and valve failure alarm 163, 163′. Subsequently, if the "EMERGENCY STOP" switch SW5 is deactivated, controller 127 will then resume the cycle of operation previously interrupted, as mentioned earlier.

Switch SW6 is designated as a "DIMAKE-UP" switch. The switch has three positions, one with arm 192 rotated to electrically connect associated contacts "a" and "b", designated as an "ON" position. An "OFF" position is provided with contact arm 192 rotated to electrically connect associated contacts "a" and "c". Lastly, an "AUTO" position is provided with arm 192 rotated to electrically connect associated contacts "a" and "d". When this switch is in its "ON" position, controller 127 responds by outputting control signal 63 to energize or open solenoid operated valve SV11, for permitting deionized water to begin refilling tank T1, assuming it requires such refilling. If switch SW6 is in its "OFF" position, controller 127 is programmed to inhibit operation of valve SV11. When switch SW6 is placed in its "AUTO" position, controller 127 is programmed to open valve SV11 if tank T1 has a DI water level below the high or fill level sensed by level sensor 133. During such a refill operation, in this example, controller 127 is programmed to turn off valve SV11 upon sensing signal 70 indicative of tank T1 being filled.

Switch SW7 is designated as a "START CLEAN-UP SEQUENCE" pushbutton. When this momentary contact pushbutton switch is depressed, controller 127 is programmed to respond to the electrical connection of contacts "a" and "b" thereof via contact pushbutton arm 194, by first checking to determine if the "EMERGENCY STOP" pushbutton switch SW5 is pushed in or activated. If the answer is "yes", controller 127 is programmed to activate or turn on all panel lamps 160 through 177, for alerting the operator that the emergency "STOP" pushbutton SW5 is activated in addition to serving as a lamp test signal for the controller. However, if the emergency "STOP" pushbutton SW5 is not so activated, controller 127 will then check to determine if the SYSTEM CONTROL switch SW 3 is positioned in its "PB START" position. If the answer is "yes", controller 127 will proceed to initiate one entire cycle of treatment of the coating composition 1, for removing metallic ions therefrom. However, if the answer is "no", controller 127 is programmed to then check to determine if the system control switch is in its "OFF" position. If the answer is "yes", controller 127 will run a valve failure test. The air operated valves AV1 through AV10 are each provided with an associated lamp (not shown), that controller 127 is programmed to energize in a flashing or blinking manner when any of the associated valves are tested to be inoperative. Alternatively, if controller 127 senses that the "SYSTEM CONTROL" switch SW3 is not in its "OFF" position, but in its "AUTO" position, controller 127 will initiate repetitive or periodic cycles of treatment of the coating composition 1.

Operation of the system will now be described. The controller 127 includes a microprocessor that is programmed for providing stabilization of the coating composition bath 1, by periodically circulating a portion of the coating composition from tank T4 through the ion exchange column 29 (in a downflow direction as indicated by arrow 6) and back to tank T4 after treatment. For setting the system into an automatic mode of operation, an initialization process or mode of operation must first be conducted. The steps for the initialization mode of operation are as follows:

1. Manually place the regeneration pump switch SW1 in its "AUTO" position.

2. Manually place the paint pump switch SW2 in its "AUTO" position.

3. Manually pull the emergency "STOP" switch SW5 out to its inactive position.

4. Manually place the regen chemical pump switch SW4 in its "AUTO" position.

5. Manually place the DI MAKE-UP switch SW6 in its "AUTO" position.

6. Controller 127 checks the status of high level signal 70 to determine whether DI water level in tank T1 is at high level. If not, controller 127 is programmed to apply control signal 63 to valve SV11, for refilling tank T1 with DI water until level signal 70 is sensed, whereafter control signal 63 is terminated and the next step pursued.

7. Controller 127 checks for the presence of level signal 74 to determine if the new regenerant acid in tank T2 is above a predetermined low level. If it is not, controller 127 generates control signal 61, for opening solenoid valve SVP2, to supply air signal M to pump P2, for energizing that pump to refill acid into tank T2. When controller 127 senses the presence of level signal 72, control signal 61 is terminated, closing valve SVP2, thereby turning off pump P2.

8. Manually set the system control switch SW3 to either its "AUTO" or "PB START" positions, or leave the switch SW3 in its "OFF" position.

9. If system control switch SW3 is in its "OFF" position, the system is in a manual mode of operation, and resets to the beginning of a treatment cycle for coating composition 1.

10. If the system control switch SW3 is not in its "OFF" position, is it in its "PB START" position? If the answer is "yes", proceed to next step, if "no", switch SW3 is "AUTO" position. Proceed to step 14.

11. Manually press the "START CLEAN-UP SEQUENCE" switch SW7 to cause the system to run the following complete process sequence once, then stop sequencing and return system to "STAND BY".

12. Pumps P1, P2, and P3 are de-energized, and stroke counters 11 and 44 for P1 and P3, respectively, are reset.

13. Valves AV1 through AV8 are sequentially cycled to test the operation thereof, and to reset all valve operators to "closed" positions, before proceeding to the next mode of operation for coating bath 1 circulation.

14. If the "SYSTEM CONTROL" switch SW3 is in its "AUTO" position, controller 127 is programmed to automatically and periodically run the system through a "FEED/REGEN SEQUENCE", with the sequence being repeated a predetermined number of hours after each such cycle of operation.

15. After a predetermined period of time, go to step 12, perform steps 12 and 13, and proceed to the next mode, Mode II of operation.

After the initialization mode I of operation, controller 127 is programmed to proceed with Mode II of operation, for circulating coating composition 1 in a downflow direction (see arrow 6) through ion exchange column 29, via the following steps:

1. To initiate the displacement of DI water from IEX column 29, produce control signals 50 and 52 for opening valves AV1 and AV3, respectively.

2. Produce control signal 60 for opening SVP1, to provide air signal L for energizing pump P1 to pump a predetermined number of gallons of coating composition 1 into IEX column 29, to displace DI water therefrom (each stroke sensed by counting associated pulses of signal SIN1 represents 0.016 gallons).

3. Pump P1 draws coating composition bath or paint 1 from T4, and feeds through filter F1, for removing coagulated paint and debris from the paint 1, to protect IEX column 29.

4. The voltage level of signal PR1 is sensed to detect any clogging of filter F1.

5. Coating composition 1 passes through valve AV1, and check valve 25, and therefrom enters IEX column 29 in a downflow direction 6, displacing DI water as it enters IEX column 29.

6. DI water being displaced, flows from IEX column 29, through valve AV3, and throttle valve TV4 (latter manually set for a predetermined flow rate).

7. Discharge displaced DI water through Tee coupling 37 to waste treatment facility, or for collection for waste treatment.

8. Terminate control signal 52, for turning off SV3, thereby terminating air control signal C, for closing valve AV3, but keep valve AV1 open.

9. Initiate programming for providing steps for circulating coating composition bath or paint 1 through IEX column 29, and returning the treated paint 1 back to tank T4.

10. Produce control signal 51 to open valve SV2, for providing air control signal B to open valve AV2.

11. Circulate coating composition 1 from tank T4, through pump P1, through filter F1, valve AV1, check valve 25, downflow 6 through IEX column 29, through valve AV2, filter F2, throttle valve TV1 (set for a given flow rate), through check valve 103, Tee coupling 107, for discharge back into tank T4.

12. Monitor the voltage level of signal PR1 for clogging of filter F1, whereby if PR1 goes to +5 volts, for example, activate alarm light L2 to inform operator to replace filter F1, after this cycle is completed for removing metal ions from coating composition 1.

13. Monitor the voltage level of pressure signal PR2, whereby if signal goes to +5 volts, for example, activate alarm light L1 to inform operator to replace filter F2, after this treatment cycle is completed.

14. After counting a predetermined number of strokes for pump P1, indicative of a predetermined quantity of coating composition 1 being passed through IEX column 29, terminate control signal 60 for turning off pump P1.

15. Reset counter (not shown) in software programming which is incremented by stroke counter 11.

16. Terminate control signal 50, for closing valve AV1.

17. Go to Mode III.

The next mode of operation, Mode III, includes programming controller 127 to flush the IEX column 29 with deionized water by use of the following steps:

1. To initiate the displacement of residual coating composition 1 from IEX column 29, continue to generate control signal 51 for keeping valve AV2 open, concurrent with generating control signals 56 and 57, causing valves SV7 and SV8, respectively, to open, producing air signals G and H, respectively, in turn causing valves AV7 and AV8, respectively, to open.

2. Generate control signal 62 for opening valve SVP3, producing air signal N, for energizing pump P3.

3. Draw DI water from tank T1, through valve AV7, pump P3, rotometer 40, check valve 38, throttle valve TV3 set for a given flow rate, valve AV8, into IEX column 29 in a downflow direction 6, for forcing residual coating composition therefrom through valve AV2, filter F2, throttle valve TV1, check valve 103, and Tee coupler 107, for discharge into tank T4.

4. During such circulation, monitor pressure signal PR2, and if this signal changes state, such as going from zero to +5 volts, for example, activate alarm light L1 to inform operator to replace filter F2, after completing this cycle of operation.

5. Through monitoring of signal SIN2, count the number of strokes of pump P3, for determining when to proceed to step 6.

6. Terminate control signal 51 for turning off valve AV2, while maintaining control signals 56 and 57 for keeping valves AV7 and AV8 turned on.

7. Initiate the next cycle for flushing out IEX column 29 with DI water, by first generating control signal 52, for turning on valve SV3, for producing air control signal C, for opening valve AV3.

8. Count the pulses of the associated stroke indicator signal SIN2 while drawing DI water 2 from tank T1, through valve AV7, pump P3, rotometer 40, check valve 38, throttle valve TV3, valve AV8, through IEX column 29 in a downflow direction 6, therefrom through valve AV3, through throttle valve TV4, and Tee coupler 37, for discharge out of the system for treatment.

9. After a given quantity of DI water 2 has been passed through IEX column 29, terminate control signal 62 for turning off P3.

10. Terminate control signals 52, 56, and 57, for turning off valves AV3, AV7, and AV8, respectively.

11. Go to Mode IV if used, otherwise go to Mode V.

In one embodiment of the invention, which is optional, a fourth mode of operation is next entered into for initiating the regeneration of the resin 30 in IEX column 29 by first circulating once used acid 113 from tank T3 through IEX column 29 in a downflow direction (see arrow 6). This optional Mode IV comprises the following steps:

1. Monitor level signals 75, 76, and 77, and if at any time during this mode the level of used acid in tank T3 drops below a predetermined low level as indicated by level signal 77, terminate this mode of operation, and transfer to Mode V.

2. Generate control signal 58 to open valve AV9.

3. Generate control signal 57 for opening valve AV8.

4. Generate control signal 52 for opening valve AV3.

5. Generate control signal 62 for energizing pump P3.

6. Monitor SIN2 for counting the number of strokes of pump P3 for a predetermined number of strokes, for permitting a predetermined quantity of used acid 113 to circulate from tank T3, through the flowpath including in series succession valve AV9, pump P3, rotometer 40, check valve 38, throttle valve TV3, valve AV8, IEX column 29 (downflow circulation 6 therethrough), valve AV3, valve TV4, and Tee coupling 37 from which the reused acid 113 is discharged from the system for treatment.

7. Terminate control signal 62 with the occurrence of either one of a predetermined number of strokes of pump P3, or the level of used acid in tank T3 dropping to a low level as indicated by level signal 77 going from +5 volts to zero volt, in this example.

8. Terminate control signal 58 for closing valve AV9.

9. Terminate control signal 52 for closing valve AV3.

10. Continue to generate control signal 55, and immediately proceed to Mode V.

Mode V provides for circulating new regenerant acid 68 from tank T2 through IEX column 29 (see arrow 6), for completing the regeneration of the resin 30 contained in IEX column 29 by removing metal ions from the resin 30. If the embodiment of the invention for including a used acid tank T3, for using once used acid 113 for the initial regeneration of the resin 30 in IEX column 29 is not used, Mode V of operation is entered into immediately after Mode III, and the regenerant acid 68 from tank T2, after passing through IEX column 29, is discharged from the system for treatment. The steps for Mode V of operation are as follows:

1. Generate control signal 52 for opening valve AV3.

2. Generate control signal 54 for opening valve AV5.

3. Generate control signal 57 for opening valve AV8.

4. Generate control signal 62 for energizing pump P3, for circulating fresh regenerant acid 68 from tank T2 through IEX column 29 in a downflow direction (see arrow 6).

5. Monitor signal SIN2 for counting the number of strokes of pump P3 for determining when a predetermined quantity of new regenerant acid 68 has been passed through IEX column 29 and discharged from Tee coupling 37 for waste treatment at which time terminate control signal 62 for turning off pump P3.

6. Reset stroke counter 44.

7. Terminate control signal 52 for closing valve AV3.

8. Terminate control signal 54 for closing valve AV5.

9. Continue to generate control signal 57 to keep valve AV8 open.

Mode VI-A is provided via programming controller 127 for rinsing IEX column 29 in a downflow direction 6 with DI water, and discharging the rinse water from the system for waste treatment. If the embodiment of the invention for including a used acid tank T3, and for using once used acid 113 for the initial regeneration of the resin 30 in IEX column 29 is used, the solution initially discharged from the IEX column is circulated to tank T3 for refilling the used acid 113 in that tank, whereafter any further rinse solution circulated through IEX column 29 is discharged for waste treatment. Mode VI-A includes the following steps:

1. Generate control signal 56 for opening valve AV7.

2. Go to step 11 if the embodiment including tank T3 for permitting the use of once used acid 113 is not employed, otherwise go to the next step.

3. Generate control signal 59 for opening valve AV10.

4. Generate control signal 62 for energizing pump P3.

5. Monitor signal SIN2 for counting the number of strokes of pump P3, for monitoring the quantity of DI water being pumped therethrough.

6. Monitor level signals 70 and 71 for sensing the level of DI water 2 in tank T1.

7. If level signal 71 becomes not energized for at least three minutes before a predetermined quantity of DI water has passed through IEX column 29, terminate control signal 62 for turning off pump P3, and generate control signal 63 for turning on valve SV11 for refilling tank T1 with DI water, until level signal 70 goes "HIGH", whereafter control signal 63 is terminated, and control signal 62 regenerated for turning pump P3 back on for the remainder of the rinse cycle.

8. Monitor liquid level signals 75, 76, and 77 for tracking the level of used acid in tank T3.

9. Terminate control signal 62 for turning off pump P3 either upon detecting level control signal 75 becoming energized, indicating tank T3 is full with once-used acid 113, or upon counting a predetermined number of strokes of pump P3 indicative of a predetermined quantity of used regenerant acid having been passed from IEX column 29 to tank T3.

10. When tank T3 has been refilled with used acid 113, terminate control signal 59 for closing valve AV10.

11. Generate control signal 52 for opening valve AV3 to change destination of solution to waste treatment.

12. Generate control signal 62 for energizing pump P3.

13. Continue to monitor stroke signal SIN2 for accumulating additional stroke counts for pump P3.

14. Terminate control signal 62 to pump P3 after a predetermined quantity of DI water 2 has passed through IEX column 29.

15. Terminate control signals 52 and 57 for closing valves AV3 and AV8 to conclude downflow rinsing Mode VI-A.

Mode VI-B is provided via controller 127 for rinsing IEX column 29 in an upflow direction 8 with DI water, and discharging the rinse water from the system for waste treatment. This upflow flushing operation is performed at a predetermined velocity for the flow of DI water to fluidize the ion exchange resin 30 in the IEX column 29, for substantially removing foreign particulate material from IEX column 29. In this manner, plugging of the IEX column 29 by the buildup of the foreign particulate material over a number of subsequent cycles of operation is prevented. Note that in an engineering prototype of the system, a top diffuser of IEX column 29 was modified to have more porous and open, yet tortuous fluid paths, for insuring that coagulated latex material passes through and out of the IEX column 29, while retaining ion exchange material 30 therein. Mode VI-B includes the following programming steps:

1. Generate control signal 51 for opening valve AV2.
2. Generate control signal 53 for opening valve AV4.
3. Generate control signal 56 for opening valve AV7.
4. Generate control signal 62 for energizing pump P3.
5. Monitor signal SIN2 for counting the number of strokes of pump P3, for monitoring the quantity of DI water being pumped therethrough.
6. Monitor level signals 70 and 71 for sensing the level of DI water 2 in tank T1.
7. If level signal 71 goes to zero volt, for example, before a predetermined quantity of DI water has passed through IEX column 29, terminate control signal 62 for turning off pump P3, and generate control signal 63 for turning on valve SV11 for refilling tank T1 with DI water, until level signal 70 goes to +5 volts whereafter control signal 63 is terminated, and control signal 62 regenerated for turning pump P3 back on for the remainder of the rinse cycle.
8. Terminate control signal 62 after a predetermined quantity of DI water 2 has passed through IEX column 29.
9. Terminate control signals 51, 53, and 56, for turning off valves AV2, AV4, and AV7.

The bath stabilization modes of operation, specifically Modes I through VI, provide one complete cycle of treatment of the coating composition 1 for removing metal ions therefrom, and for regenerating the resin 30 in IEX column 29. Controller 127 can be programmed in an automatic mode of operation for periodically repeating these Modes I through VI, for stabilization of coating composition bath 1.

Note that in the Mode II programming for circulating coating composition 1 through IEX column 29 for removal of metal ions therefrom, depending upon the particular system requirements, controller 127 can be programmed to either pass a predetermined quantity of coating composition 1 through IEX column 29, before proceeding to Mode III, or the programming can be such to provide for the system circulating coating composition 1 through IEX column 29 until such time that the differential between conductivity signals C1 and C2 reduces to a predetermined level, whereafter Mode II is terminated and Mode III is then initiated. Similarly, in the Mode VI operation, controller 127 can be programmed to either rinse IEX column 29 with a predetermined quantity of DI water 2, or to continue rinsing IEX column 29 with DI water 2 until the conductivity signal C3 reduces to a predetermined minimum value, indicating that no residual regenerant acid 68 or 113 remains in the IEX column 29. It is particularly important to insure that IEX column 29 is completely rinsed and cleared of all residual acid, in that high concentrations of remaining acid therein will cause the coating composition 1 to coagulate within IEX column 29, clogging the system.

The controller 127 is also programmed to provide a mode of operation for testing for multiple types of alarms. The test programs will now be described in detail. Note that the programming is such that the test programs can only be run if the system control switch SW3 is in either its "AUTO" or "PB START" position. There are eight different test modes, most of which require manual operations in addition to automated operation.

Test Mode 1 provides for energizing lamp 160, and lighting backlit panel display 160', if used for indicating "OUTLET PRESSURE LOW". As previously explained, this alarm indicates that the pressure measured in the line between filter F2 and TV-1 is low, meaning that the filter F2 is clogged and must be changed. The alarm is energized through sensing by controller 127 of the pressure signal PR2 changing state, such as going from +5 volts to zero volt, for example, indicating a low outlet pressure. The steps involved in this first test mode are as follows:

1. If pump P1 is energized for more than 15 seconds, with signal PR2 at a level of zero volt, in this example indicative of a low outlet pressure, lamp signal L1 is generated for energizing lamp 160, and display 160' if used. Note that lamp signal L10 is also generated at this time for energizing lamp 169 and associated display 169' (if used), the "ALARM LIGHT". Further note that the latter is always energized whenever any of the individual alarms in the system are activated.
2. If low outlet pressure is detected during a given cycle of operation, complete the cycle of operation, but do not initiate the next cycle until the problem is corrected, or if no cycle of operation is being conducted at the time, new cycles are inhibited from being initiated until the problem is corrected.
3. If major maintenance is required, manually correct the condition causing the alarm, and reset the system by switching the "SYSTEM CONTROL" switch SW3 to its "OFF" position, and then back to its previous position, either "AUTO" or "PB START". If the latter, press pushbutton switch SW7 for restarting the cycle of operation.
4. If major maintenance is not required, skip the immediately prior step, and manually push the "EMERGENCY STOP" pushbutton switch SW5 into its latching depressed position, for turning off all system operations and functions.

5. Manually investigate the faulting condition, and correct the same.

6. After correcting the problem, pull out the "EMERGENCY STOP" switch SW5 for resuming operation of the system in the interrupted cycle.

A second test mode, "Test Mode 2", provides for detecting whether filter F1 has been clogged. This Test Mode includes the following steps:

1. Monitor pressure signal PR1.

2. If PR1 goes "HIGH" for more than 15 seconds during energization of pump P1, generate lamp signals L2 and L10, for energizing lamp 161 and associated backlit display 161' (if used), and lamp 169 and associated display 169' (if used).

3. Complete present cycle of operation, and inhibit execution of a new operating cycle, until the problem is corrected.

4. If the problem cannot be easily corrected, correct the same and manually reset the system through use of the "SYSTEM CONTROL" switch SW3, first to its "OFF" position, and then to the position it was in prior to sensing a high delta pressure across filter F1.

5. If the problem can be easily corrected, skip the previous step, and manually depress "EMERGENCY STOP" switch SW5 for preventing operation of any portion of the system.

6. Change filter F1.

7. Pull out the pushbutton for "EMERGENCY STOP" switch SW5.

8. Resume the cycle of operation interrupted during the fault condition.

A third Test Mode, Test Mode 3, providing for testing solution levels prior to starting a cycle of operation, involves the following steps:

1. Monitor level signals 70 through 77.

2. If before starting any given cycle of operation, any of the levels are incorrect for initiating an associated cycle of operation, generate lamp signal L3 for energizing lamp 162, and the associated backlit display 162', if used.

3. If the levels are subsequently corrected, terminate lamp signal L3.

4. If the system is not operating in one of Modes I through VI for obtaining bath stabilization, and an incorrect fluid level is detected in at least one of tanks T1, T2, T3, generate lamp signal L3 for energizing lamp 162, and the associated backlit display 162', if used 5. If for three minutes or some other programmed predetermined period of time, for example, level signal 70 remains at zero volt, and/or level signal 74 remains at zero volt, and/or level signal 77 remains at zero volt (assumes optional use of used acid in tank T3), indicative that the DI water level, and/or new regenerant acid level in tank T2, and/or used acid level in tank T3, are incorrect for initiating treatment of the coating composition bath 1, generate lamp signal L3 for energizing lamp 162, and associated backlit display 162', if used.

6. Inhibit start-up of system operation, if lamp signal L3 is energized.

7. Manually depress the "EMERGENCY STOP" switch SW5 to permit any required maintenance of the system to be conducted in a safe manner.

8. Manually correct the liquid level problems in one or more of the fluid levels in tanks T1, T2, and, if used, tank T3.

9. Manually pull out the "EMERGENCY STOP" switch SW5 for permitting operation of the system.

10. Manually depress the "START CLEAN-UP SEQUENCE" switch SW7, if it is desired to initiate a clean-up sequence.

11. Return to step 2.

The next test mode, Test Mode 4 is for detecting and providing a visual alarm if one of the air-actuated automatic valves fails. As previously mentioned, each of the automatic valves AV1–AV10 includes pairs of valve status lines 80 through 89, respectively. In this example, for each such pair of status lines 80 through 89, one of the lines has a +5 volt signal, and the other a zero volt signal when the associated valve is open, and opposite voltage level signals when the associated valve is closed. In this manner, controller 127 is able to monitor the condition of a given one of valves AV1 through AV10, at all times during the system operation. In other words, the given operation of any one of valves AV1 through AV10 results in a feedback signal being sent back to controller 127 indicative of the valve being in a present open or closed operating state, whereby controller 127 determines whether the state is the required state for the valve. The steps associated with this Test Mode 4 are as follows:

1. Monitor the valve status line pairs 80 through 89.

2. Generate lamp signal L4 for energizing lamp 163, and backlit display 163', if used for indicating that any of valves AV1 through AV10 have failed to generate a change in valve status signal within ten seconds, in this example, of generating a control signal for changing the condition of a particular one or more of the valves.

3. Upon detecting and providing an alarm of a valve failure, close all auto valves, and stop any system operation that may be in progress.

4. Manually depress the "EMERGENCY STOP" switch to permit maintenance to be pursued for correcting the valve failure.

5. Manually rotate the "SYSTEM CONTROL" switch SW3 to its "OFF" position.

6. Press in the pushbutton switch SW7 for "START CLEAN-UP SEQUENCE" while "SYSTEM CONTROL" switch SW3 is in its "OFF" position, to locate a failed valve or valves AV1–AV10.

7. The controller 127 will flash or blink a lamp at the failed air solenoid valve to indicate failure of the associated valve.

8. Manually repair or replace the failed valve or valves AV1 through AV10.

9. Manually rinse the IEX column 29 with DI water, and discharge the rinse water to waste treatment.

10. Manually rotate the "SYSTEM CONTROL" switch SW3 to either its "AUTO" or "PB START" position.

11. Manually pull out the "EMERGENCY STOP" switch SW5 pushbutton.

12. Manually depress the "START CLEAN-UP SEQUENCE" pushbutton switch SW7 for restarting a process sequence from the first step of that sequence.

The next testing sequence is Test Mode 5 for detecting and providing an alarm lamp lighting if pump P1 becomes inoperative during a sequence requiring energization of that pump. The steps for this Test Mode are as follows:

1. Monitor SIN1 for counting pump strokes of pump P1.

2. Generate control signal 60 whenever pump P1 is to be energized.

3. Generate lamp signal L9 for energizing lamp 168, and backlit display 168' (if used), for indicating energization of pump P1, responsive to receipt of pulse signals SIN1.

4. If within 15 seconds, or some other predetermined time of generating control signal 60 for energizing pump P1, less than a predetermined number of stroke signals SIN1 are detected, generate lamp signal L5 for energizing alarm lamp 164, and backlit display 164' (if used), for providing an alarm of a fault condition in pump P1 (typically a blocked discharge line).

5. If the stroke rate of pump P1 exceeds five strokes per second, or some other preprogrammed rate indicating pump P1 is pumping air instead of liquid, generate lamp signal L5 for energizing lamp 164, and backlit display 164' (if used). In this default condition, lamp 162 is continuously energized, indicating a blocked suction line.

6. Terminate any system processes that are in operation, and close all auto valves.

7. Push in the "EMERGENCY STOP" pushbutton switch SW5.

8. Manually perform maintenance to correct the malfunction of pump P1.

9. Manually pull out the "EMERGENCY STOP" pushbutton SW5 for resuming operation of the system.

Alarm Test Mode 6 provides programming of controller 127 for monitoring the operation of pump P3. The associated steps are as follows:

1. Monitor stroke indicator signal SIN2.

2. Generate control signal 62 for energizing pump P3 as required.

3. If a predetermined number of stroke signals SIN2 are not received within 15 seconds, or some other preprogrammed time of energizing pump P3, generate lamp signal L5 in a pulsed manner for blinking or flashing lamp 164, and if used associated backlit display 164', for providing an alarm indicative of a default in the operation of pump P3.

4. If signal SIN2 indicates a stroke rate for pump P3 in excess of five strokes per second or some other preprogrammed rate, indicative of pump P3 pumping air instead of liquid, generate an alarm as indicated in the previous step.

5. Stop all system processing.

6. Manually push in or depress the "EMERGENCY STOP" pushbutton SW5.

7. Perform maintenance for correcting the malfunction in pump P3.

8. Pull out the pushbutton of the "EMERGENCY STOP" switch SW5 for resuming system operation.

The next mode of testing is "Test Mode 7". This test mode is used for providing an alarm if the level of acid 68 in the new regenerant acid tank T2 drops below a predetermined level. The steps for Test Mode 7 are as follows:

1. If the level of acid 68 in the regenerant acid tank T2 drops below a predetermined low level as indicated by level signal 74 going from +5 volts to zero volt, for example, for greater than five seconds or some other preprogrammed period of time, generate lamp signal L6 for energizing lamp 165, and associated backlit display 165', if used.

2. Stop all system processing.

3. Manually depress the "EMERGENCY STOP" pushbutton SW5 for pursuing maintenance.

4. Manually correct the level of acid in regenerant acid tank T2.

5. Pull out the "EMERGENCY STOP" pushbutton switch SW5, for resuming operation of the interrupted system process.

Another test mode, Test Mode 8 is provided for monitoring the new regenerant acid level 68 in tank T2, to provide an alarm if the level of acid exceeds a predetermined level. Test Mode 8 includes the following steps:

1. Monitor level signal 72.

2. If level signal 72 goes from zero volt to +5 volts, for example, for greater than five seconds or some other preprogrammed period of time, generate lamp signal L7 for energizing lamp 166, and backlit display 166', if used; also terminate signal 61 to turn-off pump P2.

3. Continue processing without interruption.

4. Manually inspect regenerant acid tank T2 to insure safe conditions prevail.

In certain applications, level sensors may be included in tank T4, and monitored, for detecting the level of the coating composition bath 1 at given times. However, in typical autodeposition systems, because of the very thin coatings applied of the coating composition 1 to workpieces passed through the coating composition bath 1, there is very little change in the level of the coating composition bath 1 over long periods of use. Also, the coating composition material is very expensive, and typical users of such an autodeposition process take special precautions to insure that maximum use is made of the coating composition 1. As a result, only manual control of the level of the coating composition bath 1 is utilized.

In the engineering prototype system for the present invention, tank T1 is 90 gallons, tank T2 is 140 gallons, tank T3 is 30 gallons, and tank T4 is capable of containing at least 27,000 pounds of coating composition 1, requiring at least a 3,000 gallon tank. The size of tank T4 is also partly dictated by the size of the workpieces to be coated with coating composition 1, and the production rate desired in actual practice. In the prototype system, steel workpieces are immersed in the coating composition bath 1 for given periods of time to coat the workpieces. As a result, after a period of use, iron begins to build up in the coating composition, causing excess metal ions therein.

Manual titration measurements of the coating composition bath 1 may be periodically made in order to determine when to initiate the treatment cycle of the coating compound for removing a portion of the metal ions. When the titration measurement reaches a predetermined level associated with the particular coating composition used, and the metal ions involved, such as iron, zinc, or chromium, for example, the treatment cycle is initiated. Also, in certain applications titration measurements may not be required. In such applications, the starting point for initiating a treatment cycle may be determined on a time basis relative to the extent of use of the coating composition bath 1 for coating a given quantity of a particular metal.

As previously mentioned, each of the valves AV1 through AV10 have pairs of valve status signal lines 80 through 89, respectively, for permitting controller 127 to monitor the operation of the valves. Each of these valves includes two monitoring proximity switches (not shown), one for sending a signal along one of the associated valve status signal lines indicative of an open valve, the other switch being for sending a signal along the other associated valve status signal line indicative of the valve being in a closed position. In another embodiment of the invention, in the bath stabilization flow process, controller 127 is programmed prior to initiating bath stabilization Mode II sequencing, to sequentially cycle all of the valves AV1 through AV10 from closed to open to closed positions in a sequential manner, with all pumps in an "OFF" state, for testing the valves for proper operation prior to initiating an actual sequence of steps for circulating coating composition bath 1 through the system for treatment.

Note further that each one of the solenoid valves SV1 through SV10 includes a built-in lamp to indicate proper operation of the associated air operated valve AV1 through AV10, respectively. If a failure occurs in any of valves AV1 through AV10, controller 127 is programmed to cause the lamp on the associated valve to flash or blink, as previously indicated.

Note that as indicated above, for resetting visual alarms provided in the system, as discussed above, alarms associated with liquid levels of tanks T1, T2, and T3, if used, are automatically reset upon restoration of the level of liquid in the associated tank. However, pressure alarms are reset by first inactivation, followed by activation of the "EMERGENCY STOP" switch SW5. Also, the valve alarms can only be reset by placing the system in its inactive state, and servicing the valves, as indicated in the word flowcharts given above.

In the preferred embodiment of the invention, the choice of resin 30 for use in IEX column 29 is particularly critical. The resin 30 chosen as indicated above permits the system to handle a latex-based coating composition which is normally prone to coagulate and clog known systems. The present system is able to pass the entire composition plus anolyte through IEX column 29 for removing metal ions, with substantially minimal coagulation of the latex compounds in the coating composition 1.

In the treatment process for removing metal ions from the coating composition bath, the system releases hydrofluoric acid back into the coating composition 1, thereby helping to maintain a more constant level of HF in the coating composition bath 1. The measurement of HF in the coating composition bath 1 is for maintenance of the bath itself by an operator, and is not involved for indicating when the coating composition bath 1 must be treated for iron removal, for example.

With further reference to lamps 160 through 177, lamps 168, 176, 177, and 175, are green for indicating if one of the pumps P1, P2, P3 is energized, or if the system is in a standby mode of operation, respectively. Lamps 170 through 174 are yellow colored for indicating what step of a given cycle of operation is currently being conducted after the associated cycle has been initiated. Also, in the prototype system, lamp 169 is colored red, and made substantially larger than lamps 160 through 167. As previously described, lamp 169 indicates that the system has a fault condition. The particular fault condition at the time is indicated by the illumination of one or more of lamps 160 through 167, and if used, backlit displays 160′ through 167′. This color coding is not meant to be limiting, and other color schemes may be used.

An example of typical operation of the present system will now be described. The "REGENERATION PUMP" switch SW1 is rotated to the "AUTO" position, the "PAINT PUMP" switch SW2 is rotated to its "AUTO" position, the "SYSTEM CONTROL" switch SW3 is rotated to its "PB START" position, the "REGEN CHEMICAL PUMP" switch SW4 is placed in its "AUTO" position, and the "DI MAKE-UP" switch SW6 is rotated to its "AUTO" position. During this example of operation of the system, the regenerant acid tank T2 is refilled.

When the system is operating normally, all of the red alarm lights are "OFF", as are the associated backlit displays, if used. These include lamps 160 through 167, lamp 169, and backlit displays 160′ through 167′, and 169′. If an alarm condition occurs, causing one of these lamps to be energized or lit, corrective action as described above for various alarm or test conditions should be taken to remove all such alarm conditions before initiating a next cycle of operation, or completing an interrupted cycle of operation.

The coating composition bath 1 is, in this example, maintained at a particular HF concentration. The concentration is monitored manually through use of a Lineguard 101 Meter (Manufactured by Henkel Corporation, Parker+Amchem, Madison Heights, Mich.). As previously mentioned, to determine when to initiate a cycle of bath stabilization for removing metal ions from the coating composition bath 1, periodic testing of the bath by taking titration measurements can be conducted. Alternatively, an analysis can be made in a repetitive production facility, to obtain the area of workpieces coated on a daily basis, the length of time the workpieces are kept in the coating composition bath 1, and so forth, for determining the rate at which iron (in this example) or other metallic ions enter the paint or coating composition bath 1. In the example given for the prototype system of the present invention, each cycle of operation for removing metal ions from the coating composition bath typically removes between one and one and a half pounds of iron.

For the previously described system switch settings, when a bath stabilization cycle is to be initiated, an operator merely pushes the "START CLEAN-UP SEQUENCE" switch SW7 to begin Mode II operation, as described above. Also, as previously indicated, the system can be placed into a completely automatic mode of operation, for automatically entering into a bath stabilization cycle on a desired periodic schedule. Note that as the paint or coating composition 1 is circulated through the IEX column 29, the pH of the liquid discharging from IEX column 29 is typically slightly lower than the pH of the liquid entering IEX column 29. As a result, this reaction balances the acidity lost due to metal dissolution and metal oxidation in the coating composition bath 1 during use.

Note that during Mode II of operation, coating composition 1 flows downward through IEX column 29 as indicated by arrow 6. Typically the resin material 30 in the IEX exchange column 29 is in the form of beads, for providing a maximum surface area for the coating composition 1 to contact as it flows downward through the resin material 30. In the present example for coating steel workpieces, the metallic ions that must be removed are $Fe^{+3}$. These ions are exchanged in the ion exchange column 29 via the resin 30 for $H^{+}$, and the Fe depleted coating composition 1 is directly returned to tank T4, as indicated above. When the resin 30 in IEX column 29 is exhausted, Mode III is initiated for rinsing IEX column 29 with DI water, for displacing any coating composition bath 1 left in IEX column 29. In this example, IEX column 29 is next regenerated in at least Mode V, and in some applications via Modes IV and V. The resin 30 is regenerated with approximately 2% HF acid.

The present system prevents metal ions, such as iron in this example, from increasing in concentration in the coating composition bath 1 to a level negatively affecting the coatings applied to workpieces, and/or causing the latex of the coating composition 1 to coagulate. Through use of the present invention, the metal ions such as iron, for example, are separated from the latex using immobilized chelants, as represented by the example of resin 30 used in IEX column 29. Through use of the present invention, latex losses are substantially eliminated relative to prior coating deposition systems.

As indicated above, one method for determining when bath stabilization must be instituted, is to manually take a titration test of the coating composition bath 1. The titration test provides an indication of the relative amount of dissolved metal ions in the coating composition bath 1. The measurement is taken through use of a standard conductivity meter, which typically provides a measure or readout of conductivity in micro siemens. In the example given, the bath conductivity varies with the iron level or other metal ion level, which increases with continued production, and is decreased through use of bath stabilization cycles.

Although various embodiments of the present invention are shown and described herein, they are not meant to be limiting. Those of skill in the art may recognize modifications to these embodiments, which modifications are meant to be covered by the spirit and scope of the appended claims. For example, as indicated above, the present system is not limited to use with autodeposition processes involving polymer, but can be used to remove metal ions from many types of chemical baths. Also, although Mode VI-B is preferred for use when chemical bath 1 is an autodeposition bath containing latex and polymers, this mode may not be required when other types of chemical baths are treated.

What is claimed is:

1. A system automated for providing at least periodic removal of metal ions from a metal complex and contaminants from a chemical bath, said chemical bath being a latex solution containing charged latex particles and having an acidic pH to form a coating by autodeposition, said charged latex particles tending to coagulate when subjected to high shear circulation, said system comprising:

a first tank containing said chemical bath;

an ion exchange (IEX) column containing ion exchange material comprising an iminodiacetate ion exchange resin, for removing metal ion contaminants from said chemical bath;

first circulation means responsive to first control signals for drawing chemical bath from said first tank, passing it through said IEX column at a low velocity, and returning treated chemical bath from said IEX column back to said first tank, said first circulation means including means for low shear circulation of said chemical bath to substantially prevent coagulation of said latex particles;

first conductivity measurement means positioned in said chemical bath in said first tank, for providing a first conductivity signal indicative of the conductivity of said chemical bath;

second conductivity measurement means immersed in said chemical bath being returned from treatment in said IEX column to said first tank, for providing a second conductivity signal indicative of the conductivity of treated chemical bath; and controller means programmed in a first state of operation for automatically initiating the production of said first control signals in a cyclic manner, and during the resultant circulation of said chemical bath, sensing the differential between said first and second conductivity signals reducing to a predetermined minimum value, for terminating said first control signals to turn off said first circulation means.

2. The system of claim 1, further including:

a second tank containing deionized water (DI water);

second circulation means responsive to second control signals for pumping a predetermined quantity of DI water into said IEX column, for displacing residual chemical bath, and returning the displaced chemical bath to said first tank; and said controller means being programmed in a second state of operation following said first state, for producing said second control signals for a requisite period of time.

3. The system of claim 2, further including:

a waste port for discharging waste products from said system for treatment;

third circulation means responsive to third control signals, for pumping DI water from said second tank, through said IEX column in one direction for rinsing the latter, and therefrom discharging the DI water from said waste port; and said controller means being programmed in a third state of operation following said second state, for producing said third control signals for a requisite period of time.

4. The system of claim 3, further including:

a third tank containing chemical regenerant;

fourth circulation means responsive to fourth control signals, for pumping chemical regenerant from said third tank, through said IEX column, and therefrom discharging the chemical regenerant from said waste port, thereby removing metal ions from said ion exchange material, for regenerating the same; and said controller means being programmed in a fourth state of operation following said third state, for producing said fourth control signals for a requisite period of time.

5. The system of claim 4, further including:

third conductivity means positioned within said waste port, for providing a third conductivity signal indicative of the conductivity of fluids being discharged through said waste port; and said controller means being programmed in a fifth state of operation following said fourth state, for both producing said third control signals to initiate a second rinse cycle for said IEX column, and sensing said third conductivity signal reducing to a predetermined value for terminating said third control signals.

6. The system of claim 4, further including said controller means being programmed in a fifth state of operation following said fourth state, for producing said third control signals for at least a predetermined period of time necessary for rinsing said IEX column with DI water in one direction, to remove residual chemical regenerant therefrom.

7. The system of claim 6, further including:

fifth circulation means responsive to fifth control signals, for pumping DI water from said second tank, through said IEX column in an opposite direction, to insure substantially all foreign particulates are removed therefrom;

said controller means being programmed in a sixth state of operation following said fifth state of operation, for producing said fifth control signals for a requisite period of time.

8. The system of claim 1, wherein said first circulation means further includes:

first filter means between said first tank and an input port of said IEX column, for removing solid particulates from said chemical bath for substantially reducing clogging of said IEX column.

9. The system of claim 8, wherein said first circulating means further includes:

second filter means between an output port of said IEX column and said first tank, for removing ion exchange material and other solid particulates from treated said chemical bath before it is returned to said first tank.

10. The system of claim 3, further including:

a third tank containing fresh chemical regenerant;

a fourth tank containing once used chemical regenerant;

fourth circulation means responsive to fourth control signals, for pumping a predetermined quantity of once used chemical regenerant from said fourth tank, through said IEX column, and therefrom discharging the regenerant from said waste port, thereby at least partially regenerating said ion exchange material;

fifth circulation means responsive to fifth control signals, for pumping fresh chemical regenerant from said third tank, through said IEX column, and therefrom discharging the once used chemical regenerant from said waste port;

sixth circulation means responsive to sixth control signals, for pumping DI water from said second tank, into said IEX column in said one direction, for displacing once used chemical regenerant therefrom into said fourth tank;

said controller means being programmed in a fourth state of operation for producing said fourth control signals, for a requisite period of time;

said controller means being programmed in a fifth state of operation for producing said fifth control signals, for a period of time necessary for completing the regeneration of said ion exchange material;

said controller means being programmed in a sixth state of operation for producing said sixth control signals, for a period of time necessary for either filling or passing a predetermined quantity of once used regenerant chemical into said fourth tank; and said controller means being programmed in a seventh state of operation, for producing said third control signals for a requisite period of time for rinsing said IEX column in said one direction with a predetermined quantity of DI water.

11. The system of claim 10, further including:

seventh circulation means responsive to seventh control signals, for pumping DI water from said second tank, through said IEX column in an opposite direction, to insure substantially all foreign particulates are removed, and therefrom discharging the DI water from said waste port; and said controller means being programmed in an eighth state of operation for producing said seventh control signals for a period of time necessary for passing sufficient DI water through said IEX column in said opposite direction for substantially removing residual chemical regenerant therefrom.

12. The system of claim 11, further including:

first level sensing means in said fourth tank, for producing signals indicative of the level of once used regenerant chemical in said fourth tank; and said controller means being further programmed in said fourth state of operation, for responding to said signals from said first level sensing means, both for terminating said fourth control signals when the level of once used chemical regenerant reduces to a predetermined minimum level, and for initiating said fifth state of operation.

13. The system of claim 12, further including:

second level sensing means in said third tank, for producing signals indicative of the level of said fresh chemical regenerant in said third tank; and said controller means further being programmed in said fifth state of operation for terminating or inhibiting the production of said fifth control signals, in response to said level signals from said second level sensing means indicating the level of fresh regenerant chemical in said third tank reduces to a predetermined minimum level.

14. The system of claim 13, further including:

first pumping means responsive to a first pump control signal for pumping fresh chemical regenerant from a supply thereof into said third tank; and said controller means further being programmed for both applying said first pump control signal to said first pumping means, in response to said level signals from said second level sensing means being indicative of the level of fresh regenerant chemical in said third tank reducing to said predetermined minimum level, and for terminating said first pump control signal in response to the level signals from said second level sensing means being indicative of the level of fresh regenerant chemical in said third tank increasing to a predetermined maximum level.

15. The system of claim 9, further including:

first pressure sensing means connected across inlet and outlet ports of said first filter means, for producing a first clog signal if the pressure across said first filter exceeds a predetermined value; and said controller means further being programmed to respond to said first clog signal by permitting the first state of operation to be completed, and thereafter inhibiting further operation of said system until said first filter is replaced.

16. The system of claim 15, further including:

second pressure sensing means connected to an outlet port of said second filter means, for producing a second clog signal if the outlet pressure of said second filter means decreases to a predetermined minimum value; and said controller means further being programmed to respond to said second clog signal by permitting the first state of operation to be completed, and thereafter inhibiting further operation of said system until said first filter is replaced.

17. The system of claim 2, further including:

level sensing means mounted in said second tank, for producing DI water liquid levels signals indicative of predetermined minimum and maximum levels, respectively;

automatic valve means connected between a pressurized source of DI water and said second tank responsive to a valve operating signal for turning on to permit DI water to flow into said second tank; and said controller means further being programmed to respond to a DI water level signal of minimum level, for producing said valve operating signal, and subsequently to respond to a DI water level signal of maximum level, for terminating said valve operating signal.

18. The system of claim 5, further including:

fifth circulation means responsive to fifth control signals for pumping a predetermined quantity of said chemical bath from said first tank into said IEX column, for displacing therefrom residual DI water, and discharging the latter from said waste port; and said controller means being programmed in a sixth state of operation following said fifth state, for producing said fifth control signals for a requisite period of time, in preparation for said first state of operation.

19. The system of claim 7, further including:

sixth circulation means responsive to sixth control signals for pumping a predetermined quantity of said chemical bath from said first tank into said IEX column, for displacing therefrom residual DI water, and discharging the latter from said waste port; and said controller means being programmed in a seventh state of operation following said sixth state, for producing said sixth control signals for a requisite period of time, in preparation for said first state of operation.

20. The system of claim 11, further including:

eighth circulation means responsive to eighth control signals for pumping a predetermined quantity of said chemical bath from said first tank into said IEX column, for displacing therefrom residual DI water, and discharging the latter from said waste port; and said controller means being programmed in a ninth state of operation following said eighth state, for producing said eighth control signals for a requisite period of time, in preparation for said first state of operation.

* * * * *